US012571470B2

(12) United States Patent　　(10) Patent No.:　US 12,571,470 B2

Callesen et al.　　(45) Date of Patent:　Mar. 10, 2026

(54) METHOD FOR SHIFTING AN ELECTRICALLY SHIFTABLE TRANSMISSION FOR A VEHICLE, AND ELECTRICALLY SHIFTABLE TRANSMISSION

(71) Applicant: ZF CV Systems Global GmbH, Bern (CH)

(72) Inventors: Matthias Callesen, Wennigsen (DE); Uwe Winkelholz, Wennigsen (DE); Hans-Christian Jungmann, Gorxheimertal (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/956,074

(22) Filed: Nov. 22, 2024

(65) Prior Publication Data

US 2025/0172210 A1　　May 29, 2025

(30) Foreign Application Priority Data

Nov. 23, 2023　(EP) ................................... 23211652

(51) Int. Cl.
　　*F16H 61/02*　　(2006.01)
　　*F16H 59/50*　　(2006.01)
　　*F16H 59/68*　　(2006.01)
(52) U.S. Cl.
　　CPC ......... *F16H 61/0213* (2013.01); *F16H 59/50* (2013.01); *F16H 59/68* (2013.01)

(58) Field of Classification Search
　　CPC ....... F16H 59/50; F16H 59/68; F16H 61/0213
　　See application file for complete search history.

(56) References Cited

U.S. PATENT DOCUMENTS

| 2009/0011665 A1* | 1/2009 | Sakaguchi ............. B63H 25/02 |
| | | 440/1 |
| 2019/0301600 A1* | 10/2019 | Matsuura ............ F16H 61/0403 |
| 2019/0390764 A1* | 12/2019 | Geiselhardt ......... B60W 10/182 |
| 2020/0173538 A1* | 6/2020 | Lotz ...................... F16H 59/105 |

FOREIGN PATENT DOCUMENTS

| DE | 69402779 T2 | 11/1997 |
| DE | 10312400 A1 | 10/2003 |
| DE | 102019215432 A1 | 4/2021 |
| WO | 0173321 A1 | 10/2001 |

* cited by examiner

*Primary Examiner* — Edwin A Young
(74) *Attorney, Agent, or Firm* — Dickinson Wright PLLC

(57) ABSTRACT

A method (100) for shifting an electrically shiftable transmission (230) for a vehicle (200a), in particular a utility vehicle (200b), includes detecting (105) a position (P) of a shift element (235) of the transmission (230). The method includes determining (110) a plurality of movement portions (301a, 301b, 301c) which relate to a shifting process (300), on the basis of the position (P), and determining (120) a control mode (254a, 256b, 256c) based on the movement portion (301a, 301b, 301c) corresponding to the current position (P). A control signal (255) is determined using the determined control mode (256a, 256b, 256c); and the control signal (255) is output for closed-loop control of the movement of the shift element (235).

20 Claims, 2 Drawing Sheets

METHOD FOR SHIFTING AN ELECTRICALLY SHIFTABLE TRANSMISSION FOR A VEHICLE, AND ELECTRICALLY SHIFTABLE TRANSMISSION

FIELD

The present disclosure relates to a method for shifting an electrically shiftable transmission for a vehicle, in particular a utility vehicle. The present disclosure also relates to a computer program and/or a computer-readable medium, to a control unit for a vehicle, in particular a utility vehicle, having an electrically shiftable transmission, to an electrically shiftable transmission having a shift element, to an axle arrangement for a vehicle, in particular a utility vehicle, and to a vehicle, in particular a utility vehicle.

BACKGROUND

In order to bring about a shifting process, a shift element of the transmission is moved by way of an actuator in order to be brought into an operative connection with a further shift element and/or in order to release such an operative connection. Various actuators are known in this regard.

In particular, with pneumatically shiftable transmissions having a pneumatic actuation, the force acting on the shift element is barely controllable during the movement of the actuator. Comparatively high forces can result in strong mechanical loads on the components of the transmission. During the movement a pressure drop can occur, which can result in a reduced force. This can result in high shift times.

Electrically shiftable transmissions are known from the prior art. The actuator in this case is controlled electronically using closed-loop control in order to control the movement of the shift element. A target position and/or a movement of an electrical shift actuator is adjusted similarly to the target position of a pneumatic shift actuator. The target position is predefined and the shift actuator adjusts a shift element of the transmission according to the demand by utilizing a force.

DE 694 02 779 T2 describes a method for controlling a force exerted upon a shift mechanism of an automatic mechanical transmission during a shifting process, wherein the transmission has at least one shifting rail, the shift mechanism includes a shift finger driven by a motor, the shift finger interacts with the shifting rail in order to bring about the shifting of the transmission, wherein, in the method, a motor is excited using a pulse-width-modulated control signal having a variable load cycle in order to generate a target current which is applied at the motor, and wherein the current drawn by the motor is detected, wherein the load cycle of the control signal is constantly re-adjusted as a function of the error sum between the detected current and the target current plus the rate of change of the error, in order to reduce the error to zero. The motor is connected to a DC voltage source such as the vehicle battery.

An electronic control unit carries out all relevant arithmetic operations and ensures communication with other electronics systems in the vehicle. This electronic control unit controls the motor according to the described method and converts the DC voltage, for example from the vehicle battery, into suitable phase currents of the motor.

In order to control the actuator and thus, ultimately, the transmission, predetermined parameter sets can be used. The parameter sets are used for the closed-loop control of the movement carried out by the electronically controllable actuator on the basis, for example, of the position of the shift element as a controlled variable. The parameter sets do not necessarily sufficiently represent the movement of the shift element at critical positions, however, for example at a tooth-to-tooth position, i.e., the position of an incidental initial contact of the shift element with a further shift element that can be brought into operative connection with the shift element, as a result of which an engagement movement can be obstructed and the shifting process can be delayed.

In particular as compared to pneumatically shiftable transmissions and as compared to only position-controlled electrically shiftable transmissions, the shift time, or the shift performance, can be further improved. Furthermore, blocking positions, such as a tooth-to-tooth position, in a pneumatically shiftable transmission and/or an only position-controlled electrically shiftable transmission can result in high mechanical loads due to forces arising during shifting. As a result, the transmission will typically have an elaborate and complex design in order to be able to withstand the forces, and/or the high loads can reduce the service life of the transmission elements.

SUMMARY

The present disclosure is based on the object of enhancing the prior art and providing an improved method for shifting an electrically shiftable transmission. In particular, the present disclosure can achieve the object of enabling more effective shifting of an electrically shiftable transmission, which can result in an improvement in shift performance, less wear, and/or increased cost-effectiveness.

The object is achieved by a method as set forth according to aspects of the present disclosure. The present disclosure also describes optional embodiments.

According to the present disclosure, a method is provided for shifting an electrically shiftable transmission for a vehicle, in particular a utility vehicle. The method includes the steps of: detecting a position of a shift element of the transmission; determining a plurality of movement portions which relate to a shifting process, on the basis of the position; determining a control mode on the basis of a movement portion corresponding to the current position; determining a control signal using the control mode; and outputting the control signal for closed-loop control of the movement of the shift element on the basis of the control mode.

Due to the detection of the position of the shift element, the control of the shift element can be made directly dependent on the position of the shift element during the shift process. It was found that the control of an electrically shiftable transmission can be improved by segmenting the movement of the shift element, i.e., subdividing the movement of the shift element into various movement portions, on the basis of the position of the shift element. In such a movement, the shift element can move, for example, from a neutral position to an end position in which the shift element is fully engaged with a further shift element. A movement portion can be defined as a portion of the movement and/or as a portion of the positions reached during the movement. The movement portions and the position can then be used in order to determine, according to the current position of the shift element, the movement portion in which the shift element is currently located, i.e., the current movement portion. The current movement portion can then be used for the closed-loop control of the control mode and, on the basis thereof, to determine the control signal for controlling the movement of the shift element by way of the actuator. The closed-loop control can be carried out in various movement portions with various control modes. The control mode defines the type of closed-loop control of the movement of the shift element. For example, a control mode can be defined by specifying a controlled variable and/or parameters for the closed-loop control of the movement of the shift element. In other words, different control modes can be defined for different movement portions in order to be able to control, by closed-loop control, the movement in the movement portions in a differentiated manner. Therefore, the control signal can include a control mode for each of the movement portions in order to achieve, in the respective movement portions, an advantageous closed-loop control of the shift element in each case. The control signal can be the signal that was output by a control unit, which signal is applied to an actuator for the closed-loop control of the movement of the shift element, and can include, for example, a sequence of electric currents generated via pulse-width modulation.

Therefore, the potential of an electrically shiftable transmission can be further utilized. Due to the differentiated closed-loop control of the movement of the shift element, the performance can be improved and the shift time can be reduced. Furthermore, it is possible to avoid excessively high forces by closed-loop control carried out in a targeted manner, which can increase the service life of the transmission and, due to a more purposeful construction and design, the transmission can be provided in a more cost-effective manner.

Optionally, different control modes define different controlled variables. It is therefore possible to define various controlled variables for a shifting process, i.e., a movement of the shift element. For example, in a first movement portion, a first control mode can be defined using a first controlled variable and, in a second movement portion, a second control mode can be defined using a second controlled variable, which differs from the first controlled variable. The controlled variable is the variable to be held constant or variable in a targeted manner by closed-loop control. The first controlled variable and/or the second controlled variable can each be, for example, the position of the shift element, the speed of the shift element, or the force of the shift element.

Optionally, a first control mode uses a force as the controlled variable and a second control mode uses the position as the controlled variable. The first control mode implements a force control and the second control mode implements a position control. In other words, the movement of the shift element takes place in the first movement portion in a force-controlled manner by way of the first control mode and in the second movement portion in a position-controlled manner by way of the second control mode. For example, a closed-loop control of the shift element can be carried out in a first movement portion prior to a tooth-to-tooth position on the basis of the position and, in a second movement portion which includes the tooth-to-tooth position, on the basis of the force.

Optionally, the movement of the shift element is subdivided into more than two movement portions and the closed-loop control in the more than two movement portions is carried out by way of more than two different control modes. The controlled variables in two non-adjacent movement portions can be the same. By defining the various controlled variables, a closed-loop control that is as suitable as possible can be achieved in the particular movement portion.

Optionally, the control mode is determined such that different control modes differ on the basis of different parameters. It is therefore possible to define various parameters, or parameter sets, for a shifting process. For example, in a first movement portion, a first control mode can be defined using a first parameter and/or a first parameter set and, in a second movement portion, a second control mode can be defined using a second parameter and/or parameter set, which differs from the first parameter and/or parameter set. If, for example, a PID control is carried out, the parameter set that is used can be defined as a proportionality factor, an integral factor, and/or a derivative factor. In addition, the closed-loop control can be limited in each case by a maximum current, which is valid for this portion, for applying electrical energy to the electric actuator. In addition, the movement speed of the actuator can be limited by a maximum speed that is permitted in this portion. The parameter can be the proportionality factor, the integral factor, the derivative factor, the maximum current and/or the maximum speed. A parameter set is a plurality of parameters. The parameter set can therefore be composed of the proportionality factor, the integral factor, the derivative factor, the maximum current and/or the maximum speed.

Optionally, the method includes the steps of: detecting a selection parameter, wherein the determination of the control mode depends on the selection parameter. The selection parameter can therefore be defined as a variable and/or information that can define the control mode, in particular the controlled variable and/or one or multiple parameter(s). It is therefore possible that the shifting depends on one suitable parameter which can represent the operation of the vehicle, or a situation of the vehicle. The selection parameter can affect the controlled variable and/or the parameter, or the parameter set, of the control mode within one or multiple movement portion(s). Therefore, shifting characteristics that are differentiated according to the selection parameter can be provided, for example a comfortable, or quiet and smooth shift, a fast shift, and/or an emergency shift. Beyond the aforementioned exemplary shifting characteristics, further possible predefined parameter programs and closed-loop control programs are possible.

Optionally, the selection parameter depends on a driving situation, an automated driving function, and/or a user input. Therefore, the closed-loop control of the transmission can be made to depend on variables that are potentially relevant for the shifting. For example, the driving situation can be a potential hazard situation, and therefore the transmission is to be operated in terms of the highest possible shift performance. For example, the driving function and/or the user input can request an actuation of the transmission that is as smooth and/or quiet as possible, which is advantageous, in particular, at low vehicle speeds in urban traffic. The selection parameter can affect the control mode and, thus directly, the controlled variable and/or control parameters, depending, for instance, on the driving situation.

Optionally, the selection parameter defines a controlled variable and/or a parameter. Therefore, the selection parameter can require, or define, a corresponding controlled variable and/or a parameter and/or limit a value range of the controlled variables and/or of the parameter, for example with respect to the above-described driving situation, driving function, and/or user input. The control mode can therefore depend on the selection parameter as a suitable parameter that represents the vehicle state.

Optionally, the control signal is determined on the basis of a switching routine for switching between different control modes. A movement of the shift element that is as smooth as possible can therefore be ensured. For this purpose, the switching routine can include, for example, boundary conditions that define the movement of the shift element at a point between two movement portions. By defining the boundary conditions, the movement can therefore be determined at a transition between the two movement portions. A switching routine between control modes can be triggered between movement portions and/or by way of the selection parameter.

Optionally, the control signal is determined on the basis of a precontrol signal, wherein the precontrol signal depends on the position within one of the movement portions and/or a movement portion that is adjacent to the movement portion. The adjacent movement portion can be, in particular, a movement portion that is following, or is next to, the current moving portion according to the movement of the shift element. Due to the precontrol signal, a feedforward control can be achieved. For this purpose, the precontrol signal can be determined on the basis of the position and/or the adjacent movement portion and thus, for example, on the basis of a force that is necessary for a future movement of the shift element. The force can flow into the control signal as a precontrol variable. Therefore, a position error, or a deviation between a target position to be attained and an actual position, can be reduced, and the control of the shift element can thus be improved.

According to a further aspect of the present disclosure, a computer program and/or a computer-readable medium is provided. The computer program and/or computer-readable medium includes commands that, when the program or the commands are run by a computer, prompt the computer to carry out the method described here and/or the steps of the method described here. The computer program and/or computer-readable medium can include commands in order to carry out steps of the method that are described as optional, in order to achieve a corresponding technical effect.

According to a further aspect of the present disclosure, a control unit for a vehicle, in particular a utility vehicle, having an electrically shiftable transmission is provided. The control unit is designed to carry out the above-described method. The control unit can be designed to carry out steps of the method that are described as optional, in order to achieve a corresponding technical effect.

According to a further aspect of the present disclosure, an electrically shiftable transmission is provided. The electrically shiftable transmission has a shift element and the above-described control unit. Optionally, the electrically shiftable transmission is an automatic manual transmission (AMT).

According to one aspect of the present disclosure, an axle arrangement for a vehicle, in particular a utility vehicle, is provided. The axle arrangement has the above-described electrically shiftable transmission. The axle arrangement and/or the control unit of the electrically shiftable transmission can be designed to carry out steps of the method that are described as optional and/or advantageous, in order to achieve a corresponding technical effect.

According to a further aspect of the present disclosure, a vehicle, in particular a utility vehicle, is provided. The vehicle has an electrically shiftable transmission having the control unit described here and/or the above-described axle arrangement. The vehicle and/or the control unit can be designed to carry out steps of the method that are described as optional and/or advantageous, in order to achieve a corresponding technical effect.

BRIEF DESCRIPTION OF THE DRAWINGS

Further advantages and features of the present disclosure as well as the technical effects thereof can be gathered from

Figure 1:
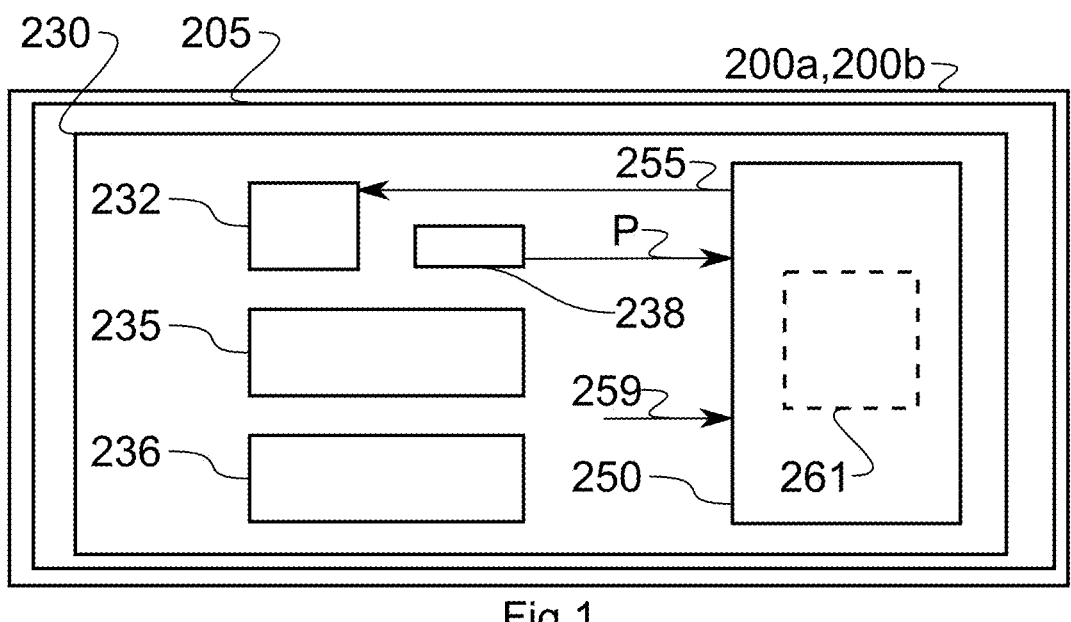
Figure 2:
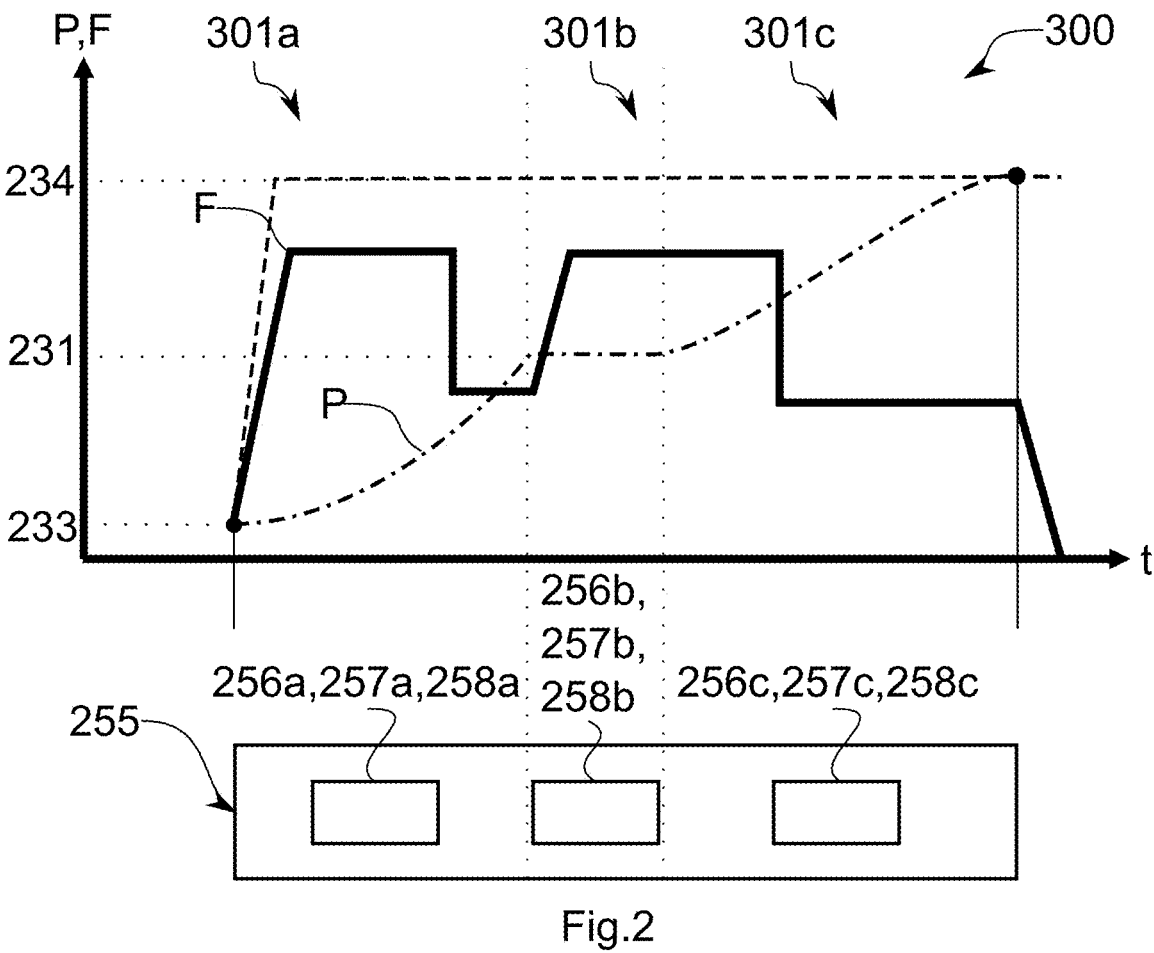
Figure 3:
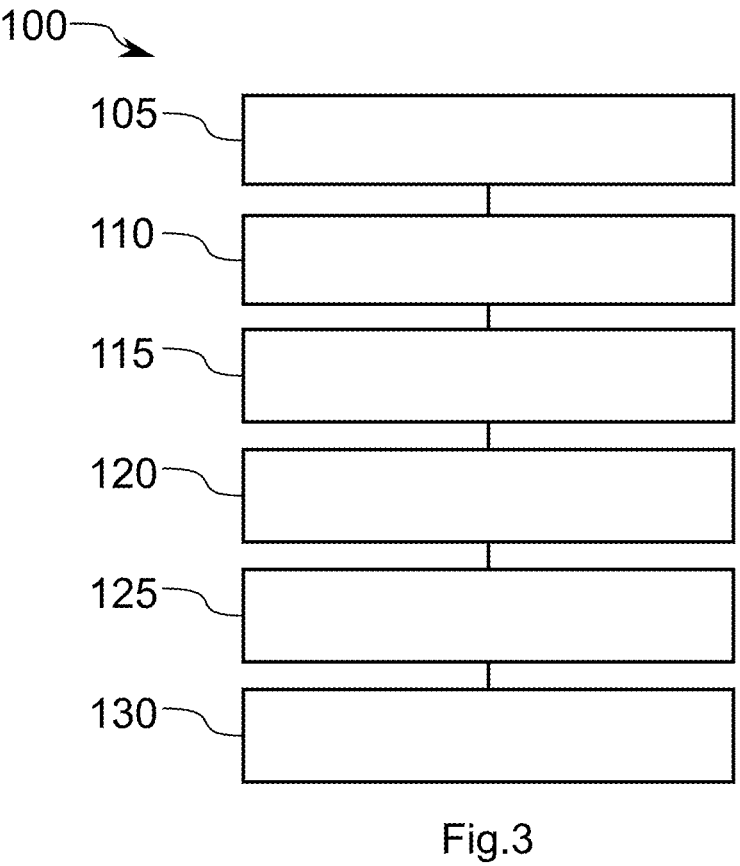

6 the figures and the description of the preferred embodiments shown in the figures, in which:

FIG. 1 shows a schematic representation of a vehicle, in particular a utility vehicle, according to one embodiment of the present disclosure;

FIG. 2 shows a schematic representation of a shifting process of a shift element of an electrically shiftable transmission and of a corresponding control signal according to one embodiment of the present disclosure; and FIG. 3 shows a schematic representation of a sequence of a method according to one embodiment of the present disclosure.

DETAILED DESCRIPTION

FIG. 1 shows a schematic representation of a vehicle 200a, in particular a utility vehicle 200b, according to one embodiment of the present disclosure. The vehicle 200a, in particular utility vehicle 200b, is referred to in the following as vehicle 200a, 200b. The vehicle 200a, 200b is a ground vehicle. The vehicle 200a, 200b is, for example, a truck, a bus and/or a tractor of a multi-part vehicle.

The vehicle 200a, 200b is designed to carry out the method 100 described with reference to FIG. 3. For this purpose, the vehicle 200a, 200b has an axle arrangement 205 including an electrically shiftable transmission 230. The electrically shiftable transmission 230 has a shift element 235 and a further shift element 236. A shifting process is achieved by bringing, for example, the shift element 235 out of a neutral position 233 and into engagement with the further shift element 236 in an end position 234 (see FIG. 2). In the process, a distance between the shift element 235 and the further shift element 236 changes. A variable describing the distance between the shift element 235 and the further shift element 236 is referred to in the following as position P. The shift element 235 carries out a movement in which the position P changes (see, schematically, the upper part of FIG. 2).

In order to adjust and/or for the closed-loop control of the position P, the transmission 230 has a control unit 250 and a controllable electrical shift actuator 232 for actuating the shift element 235. The controllable electrical shift actuator 232 includes, for example, an electronically commutated synchronous motor, or a brushless DC motor, as a servomotor.

The control unit 250 is designed to carry out the method 100 described with reference to FIG. 3 in order to shift the electrically shiftable transmission 100.

For this purpose, the transmission 230 has a position sensor 237 which is connected to the control unit 250. The position sensor 237 is designed to detect the position P of the shift element 235. The control unit 250 is designed to receive the position P from the position sensor 237. On the basis of the position P, the control unit 250 can detect the movement of the shift element 235.

The control unit 250 is designed to segment the shifting process 300, i.e., to subdivide the shifting process into movement portions 301a, 301b, 301c on the basis of the detected position P (see FIG. 2). On the basis of the detected position P and the movement portions 301a, 301b, 301c, a current movement portion 301a, 301b, 301c can be determined, i.e., the movement portion 301a, 301b, 301c in which the position P falls at a present, or current, time t (see, schematically, the upper part of FIG. 2).

The control unit 250 is designed to detect a selection parameter 259. The selection parameter 259 can depend on a driving situation 259a, an automated driving function 259b, and/or a user input 259c. For this purpose, the vehicle 200a, 200b can be designed to gather, using a surroundings sensor system, information relating to the driving situation 259a. For example, on the basis of image data and/or distance data, a hazard situation can be detected. The automated driving function 259b can relate, for example, to an automated shifting process 300 which is required by a cruise control system of the vehicle 200a, 200b. The user input 259c can be detected by an input device (not shown) in the vehicle. In order to enable the control unit 250 to detect the selection parameter 259, the control unit 250 is connected, for example via a vehicle bus (not shown), to a further control unit (not shown) for ascertaining the driving situation 259a, for carrying out the automated driving function 259b of the vehicle 200a, 200b, and/or to the input device for communication purposes.

The control unit 250 is designed to determine a control mode 256a, 256b, 256c on the basis of the movement portion 301a, 301b, 301c corresponding to the current position P. The control unit 250 is also designed to determine, by using the control mode 256a, 256b, 256c, a control signal 255 for the closed-loop control of the movement of the shift element 235.

The control mode 256a, 256b, 256c is determined such that different movement portions 301a, 301b, 301c differ on the basis of various control modes 256a, 256b, 256c having different controlled variables 257a, 257b, 257c and/or having different parameters 258a, 258b, 258c (see FIG. 2). The control mode 256a, 256b, 256c depends on the selection parameter 259. The control unit 250 can determine the control signal 255 on the basis of a precontrol signal 261, wherein the precontrol signal 261 depends on the position P within one of the movement portions 301a, 301b, 301c and/or a movement portion 301a, 301b, 301c following the movement portion 301a, 301b, 301c.

As is shown in FIG. 1, the control unit 250 and the shift actuator 232 are connected to one another for communication purposes, so that the control unit 250 can transmit, or output, the control signal 255 to the shift actuator 232 for moving the shift element 235. The control signal 255 is determined on the basis of a switching routine 260 for switching between different control modes 256a, 256b, 256c.

A shifting process 300 and such a control signal 255 are described with reference to FIG. 2.

FIG. 2 shows a schematic representation of a shifting process 300 for moving a shift element 235 of an electrically shiftable transmission 230 on the basis of a corresponding control signal 255 according to one embodiment of the present disclosure. Such a transmission 230 is described with reference to FIG. 1. FIG. 2 is described with reference to FIG. 1 and the description thereof.

According to FIG. 2, the shifting process 300 (upper part of FIG. 2) defines a relationship of the position P (dot-dashed line) and of a force F (solid line) with which the shift element 235 is moved, both as a function of time t and both on an arbitrary scale. The time t is plotted as an ordinate (value on the x-axis) and the position P and the force F are plotted as abscissas (value on the y-axis). The position P illustrated is a neutral position 233, a blocking position 231, such as a tooth-to-tooth position, and an end position 234.

In a case without blocking occurring in the blocking position 231, the shift element 235 can be brought from the neutral position 233 to the end position 234 by way of a comparatively fast movement; see the dashed line illustrating the position P of the shift element 235.

The dot-dashed line shows the position P of the shift element 235 during a movement in which the shift element 235 enters into the blocking position 231. The shifting process 300, or the movement of the shift element 230, is segmented into, for example, three separate movement portions 301a, 301b, 301c, as is schematically shown using vertical dotted lines.

The control signal 255, which is shown only schematically below the shifting process 300, is defined in portions according to the movement portions 301a, 301b, 301c and illustrates the control modes 256a, 256b, 256c defined for each portion. For each of the movement portions 301a, 301b, 301c, a control mode 256a, 256b, 256c matched to the particular movement portion 301a, 301b, 301c is defined using a controlled variable 257a, 257b, 257c and a parameter set 258a, 258b, 258c.

The movement portions 301a, 301b, 301c are characteristic of the transmission 230. The movement portions 301a, 301b, 301c and the corresponding control modes 256a, 256b, 256c can therefore be specifically adaptable for each transmission 230.

In the example shown in FIG. 2, the position P of the shift element 235 in the neutral position 233 is assumed to be the start position. The position P is detected. It is therefore established that the shift element 235 is moving from the neutral position 233 to the end position 234 via the blocking position 231. On the basis of the position P in the neutral position 233, the shifting process 300 is divided into the three movement portions 301a, 301b, 301c. A first movement portion 301a includes the movement of the shift element 235 from the neutral position 233 and before the shift element 235 reaches the blocking position 231. A second movement portion 301b includes the blocking position 231 and thus reflects, for example, an incidental initial contact between the shift element 235 and the further shift element 236 and a beginning of an engagement movement. A third movement portion 301c includes the movement of the shift element 235 after the shift element 235 has exited the blocking position 231 and thus reflects an engagement event.

In the first movement portion 301a, the movement of the shift element 235 is controlled by closed-loop control in a first control mode 256a. The closed-loop control is carried out on the basis of the position P as the first controlled variable 257a. For this purpose, a first parameter 258a, or parameter set, is predefined, which parameter or parameter set defines the position control, for example a proportionality factor, an integral factor, a derivative factor, a maximum current and/or a maximum voltage.

In order to prevent the shift element 235 from impacting the further shift element 236 with excessive speed in the blocking position 236, the position P is controlled by closed-loop control such that the force F in the blocking position 236 is reduced. Smooth shifting and reduced wear can therefore be achieved.

In the second movement portion 301b, the movement of the shift element 235 is controlled by closed-loop control in a second control mode 256a. The closed-loop control is carried out on the basis of the force F as the second controlled variable 257b. For this purpose, a second parameter 258b, or parameter set, is predefined, which parameter or parameter set defines the force control, for example a proportionality factor, an integral factor, a derivative factor, a maximum current and/or a maximum speed.

In the blocking position 231, a position control is barely conceivable. Therefore, in the blocking position 231, the force F is controlled by closed-loop control and increased or reduced until the blocking position 231 can be exited.

In the third movement portion 301c, the movement of the shift element 235 is controlled by closed-loop control in a third control mode 256c. The closed-loop control is carried out on the basis of the position P as the third controlled variable 257c. For this purpose, a third parameter 258c, or parameter set, is predefined, which parameter or parameter set defines the position control, for example a proportionality factor, an integral factor, a derivative factor, a maximum current and/or a maximum speed. The third parameter set 258c can be identical to or different from the first parameter set 258a.

FIG. 3 shows a schematic representation of a sequence of a method 100 according to one embodiment of the present disclosure. The method 100 is a method 100 for shifting an electrically shiftable transmission 230 for a vehicle 200a, in particular a utility vehicle 200b. Such a vehicle 200a, 200b is described with reference to FIG. 1. A shifting process 300 for shifting an electrically shiftable transmission 230 is described with reference to FIG. 2. FIG. 3 is described with reference to FIGS. 1 and 2.

The method 100 according to FIG. 3 includes the step of: detecting 105 a position P of a shift element 235 of the transmission 230.

The next step is that of determining 110 a plurality of movement portions 301a, 301b, 301c relating to a shifting process 300 on the basis of the position P.

The method 100 includes the step of: detecting 115 a selection parameter 259. The selection parameter 259 depends on a driving situation 259a, an automated driving function 259b, and/or a user input 259c. The selection parameter 259 is a controlled variable 257a, 257b, 257c and/or a parameter 258a, 258b, 258c.

The next step is that of determining 120 a control mode 256a, 256b, 256c on the basis of a movement portion 301a, 301b, 301c corresponding to the current position P. Different control modes 256a, 256b, 256c define different controlled variables 257a, 257b, 257c. In particular, a first control mode 256a uses a force as the controlled variable 257a, 257b, 257c and a second control mode 256b uses the position P as the controlled variable 257a, 257b, 257c. The control mode 256a, 256b, 256c is determined such that different control modes 256a, 256b, 256c differ on the basis of different parameters 258a, 258b, 258c. The step of determining 120 the control signal 255 depends on the selection parameter 259. The control signal 255 is determined on the basis of a precontrol signal 261, wherein the precontrol signal 261 depends on the position P within one of the movement portions 301a, 301b, 301c and/or a movement portion 301a, 301b, 301c that is adjacent to the movement portion 301a, 301b, 301c.

The next step is that of determining 125 a control signal 255 using the control mode 256a, 256b, 256c. The control signal 255 is determined by way of a pulse-width-modulated sequence of electric currents. The control signal 255 is determined such that the shift actuator 232, when acted upon by the control signal 255, controls the movement of the shift element 235 by closed-loop control according to the control mode 256a, 256b, 256c within the current movement portion 301a, 301b, 301c.

The next step is that of outputting 130 the control signal 255 for moving the shift element 235 on the basis of the control signal 255. The control signal 255 is determined on the basis of a switching routine 260 for switching between different control modes 256a, 256b, 256c.

REFERENCE SIGNS (PART OF THE DESCRIPTION)

100 method
105 detecting a position
110 determining a plurality of movement portions
115 detecting a selection parameter
120 determining a control mode
125 determining a control signal
130 outputting a control signal
200a vehicle
200b utility vehicle
205 axle arrangement
230 electrically shiftable transmission
231 blocking position
232 shift actuator
233 neutral position
234 end position
235 shift element
236 further shift element
238 position sensor
250 control unit
255 control signal
256a, 256b, 256c control modes
257a, 257b, 257c controlled variable
258a, 258b, 258c parameter
259 selection parameter
259a driving situation
259b automated driving function
259c user input
260 switching routine
261 precontrol signal
300 shifting process
301a, 301b, 301c movement portion
P position
t time

The invention claimed is:

1. A method (100) for shifting an electrically shiftable transmission (230) for a vehicle (200a), wherein the method (100) includes the steps of:
    detecting (105) a position (P) of a shift element (235), within a range of positions (P) of the shift element, of the transmission (230);
    determining (110) a plurality of movement portions (301a, 301b, 301c) relating to a shifting process (300) on the basis of the position (P);
    determining (120) a control mode (256a, 256b, 256c) based on a movement portion (301a, 301b, 301c) that corresponds to a current position (P) of the shift element that is detected;
    determining (125) a control signal (255) using the determined control mode (256a, 256b, 256c); and
    outputting (130) the control signal (255) for closed-loop control of a movement of the shift element (235) based on the determined control mode (256a, 256b, 256c).

2. The method (100) as claimed in claim 1, wherein different control modes (256a, 256b, 256c) define different controlled variables (257a, 257b, 257c).

3. The method (100) as claimed in claim 2, wherein a first control mode (256a) uses a force of the shift element as the controlled variable (257a, 257b, 257c) and a second control mode (256b) uses the position (P) as the controlled variable (257a, 257b, 257c).

4. The method as claimed in claim 3, wherein closed-loop control of the shift element is carried out in a first movement portion prior to a tooth-to-tooth position on the basis of the position and, in a second movement portion which includes the tooth-to-tooth position, on the basis of the force.

5. The method as claimed in claim 4, wherein the movement of the shift element is subdivided into more than two movement portions and closed-loop control in the more than two movement portions is carried out by way of more than two different control modes.

6. The method as claimed in claim 5, wherein the controlled variable in two non-adjacent movement portions is the same.

7. The method (100) as claimed in claim 2, wherein the control signal (255) is determined based on a switching routine (260) for switching between the different control modes (256a, 256b, 256c).

8. The method (100) as claimed in claim 1, wherein the control mode (256a, 256b, 256c) is determined such that different control modes (256a, 256b, 256c) differ based on different parameters (258a, 258b, 258c).

9. The method (100) as claimed in claim 1, wherein the method (100) includes the steps of:

detecting (115) a selection parameter (259), and wherein the step of determining (120) the control mode (256a, 256b, 256c) depends on the selection parameter (259) that is detected.

10. The method (100) as claimed in claim 9, wherein the selection parameter (259) that is detected depends on a driving situation (259a), an automated driving function (259b), and/or a user input (259c).

11. The method (100) as claimed in claim 10, wherein the selection parameter (259) that is detected defines a controlled variable (257a, 257b, 257c) and/or a parameter (258a, 258b, 258c).

12. The method (100) as claimed in claim 1, wherein the control signal (255) is determined based on a precontrol signal (261), wherein the precontrol signal (261) depends on the position (P) within one of the movement portions (301a, 301b, 301c) and/or a movement portion (301a, 301b, 301c) that is adjacent to the movement portion (301a, 301b, 301c).

13. A non-transitory computer-readable medium, including commands stored thereon that, when the commands are executed by a computer, cause the computer to carry out the method (100) as claimed in claim 1.

14. A control unit (250) for the vehicle (200a) having the electrically shiftable transmission (230), wherein the control unit (250) is configured such that it carries out the method (100) as claimed in claim 1.

15. The electrically shiftable transmission (230) having the shift element (235) and the control unit (250) as claimed in claim 14.

16. An axle arrangement (205) for the vehicle (200a), wherein the axle arrangement (205) includes the electrically shiftable transmission (230) as claimed in claim 15.

17. The vehicle (200a) having the axle arrangement (205) as claimed in claim 16.

18. The vehicle (200a) having the electrically shiftable transmission (230) as claimed in claim 15.

19. The method as claimed in claim 1, wherein the movement portions are segments of the movement of the shift element within the range of positions of the shift element.

20. The method as claimed in claim 1, wherein the position (P) is a distance between the shift element and a further shift element.

* * * * *